Patented Apr. 5, 1927.

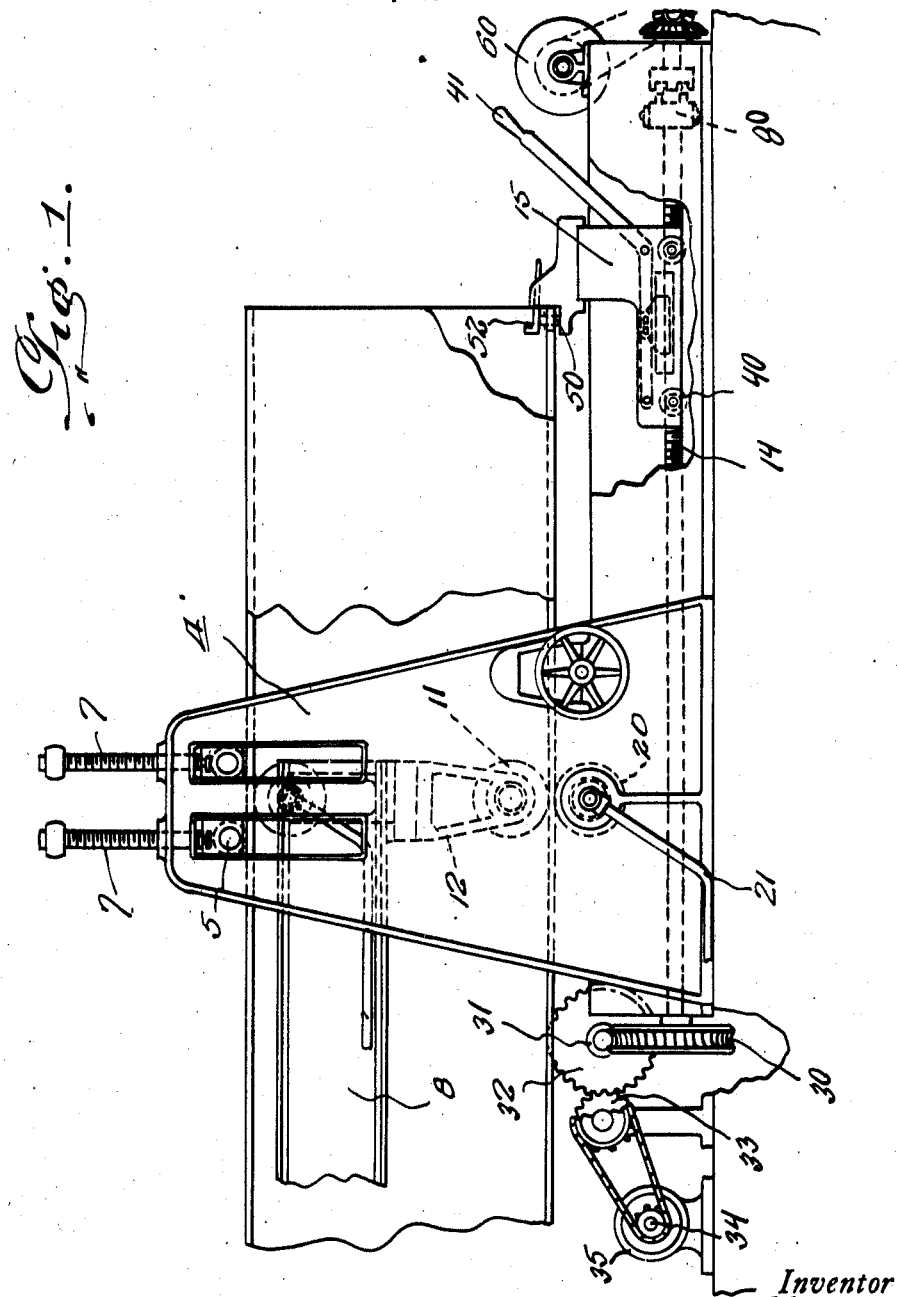

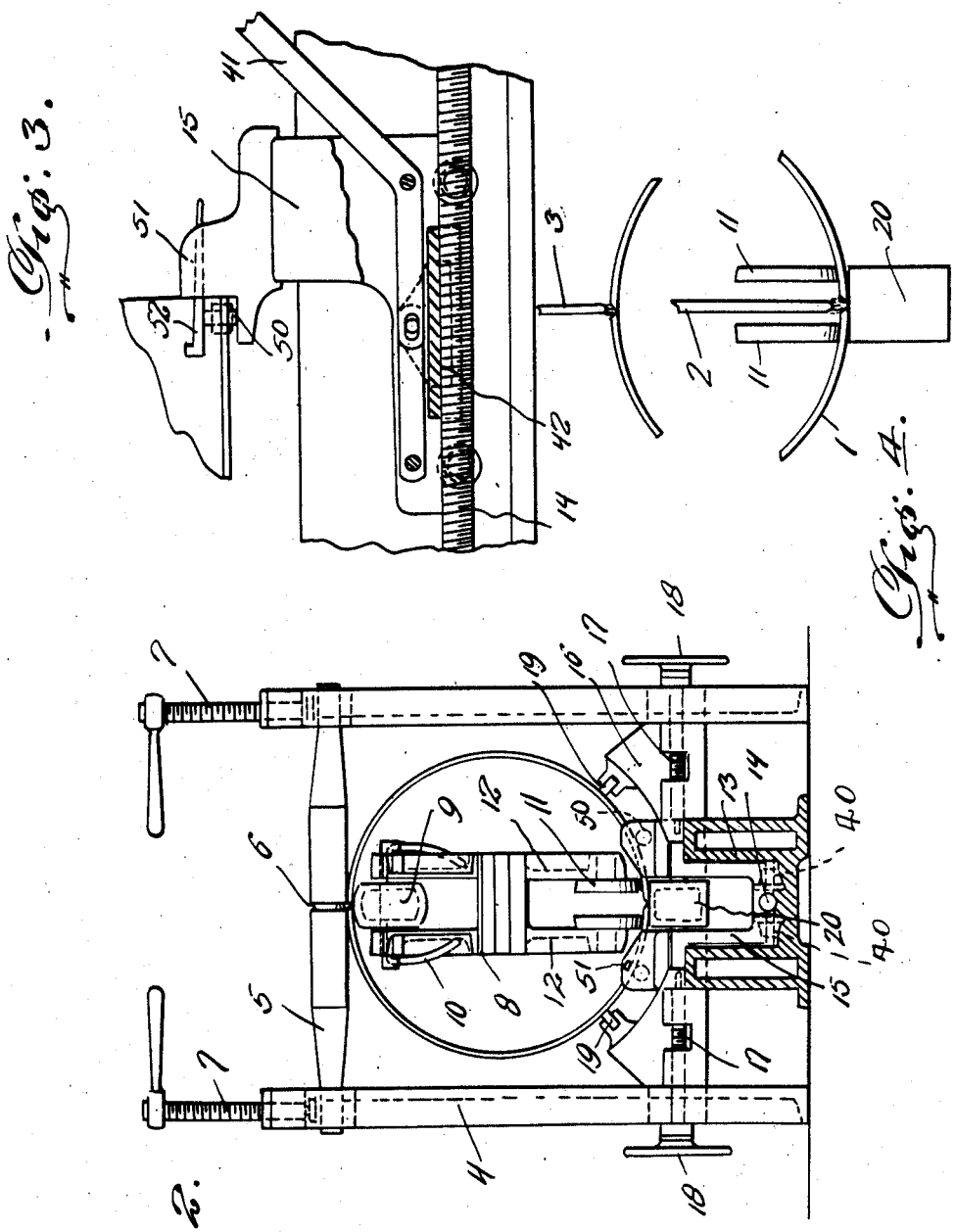

1,623,434

UNITED STATES PATENT OFFICE.

FRANK P. OFNER AND WALTER H. NOURSE, OF PORTLAND, OREGON.

PIPE-WELDING APPARATUS.

Application filed April 28, 1926. Serial No. 105,243.

Our present invention pertains to pipe welding apparatus, and has for one of its objects the provision of an apparatus in which upper and lower electric arcs are utilized to weld pipe sections while the same are being moved through the apparatus.

Another object of the invention is the provision of an apparatus in which at the top of the pipe sections an electric arc is used at the outer side of the pipe sections and at the bottom of the pipe section an electric arc is used inside, this while the pipe sections are being moved through the apparatus and while both the top and bottom seams are under constant pressure to effect intimate contact with the ground incident to the welding operation so that the production of a clean solid weld or welds free from burnt spots or slag pockets is assured.

Other objects and practical advantages of the invention will be fully understood from the following description and claims when the same are read in connection with the drawings, accompanying and forming part of this specification, in which:—

Figure 1 is a view in side elevation and with parts broken away, illustrative of the best practical embodiment of our invention of which we are cognizant.

Figure 2 is an elevation at right angles to Figure 1 and with parts in vertical section.

Figure 3 is a fragmentary view illustrative of a portion of the mechanism for feeding the pipe sections longitudinally.

Figure 4 is a view diagrammatic in character illustrating the arcing means in proper relative arrangement to the contiguous longitudinal edges of the pipe sections.

Similar numerals of reference designate corresponding parts in all of the views of the drawings.

By particular reference to Figure 4, it will be understood that the space between the contiguous lower edges of the pipe sections 1 is flared or increased in width upwardly, and that the space between the upper contiguous edges of the pipe sections 1 is similarly shaped. It will also be understood that the electrodes designated by 2 and 3, respectively, are arranged in vertical alinement with the spaces between the longitudinal pipe section edges, and therefore when the pipe sections 1 are held and fed in the manner before described adequate grounding means will be afforded for the electric current supplied to the electrodes 2 and 3 and the formation of efficient welds will be assured, and this without liability of burnt spots or slag pockets in the welds.

The main frame of the apparatus may be of the general construction illustrated or of any other construction compatible with the purpose of the apparatus, and among other elements said main frame comprises side standards 4 in which are mounted transverse rolls 5, the said rolls 5 having circumferential grooves 6 in vertical coincidence with the upper seam of the pipe, and being backed by screws 7 through the medium of which the rolls 5 are held under pressure against the pipe sections.

Appropriately fixed at one end, not shown, is a mandrel 8 of stationary character, and by said mandrel 8 is carried an upper hollow roll 9, preferably of copper or analogous material, which is filled at all times with cooling water that passes through pipes 10 in connection with the interior of the roll. The circulation of cooling water through the roll 9 is materially advantageous inasmuch as it precludes overheating of the roll 9 and thereby enables said roll 9 to contribute toward the maintenance of a perfect ground essential for a thorough welding operation.

At 11 are bottom pipe rolls arranged in spaced relation, Figure 2, and carried by hangers 12 on the mandrel 8; it being noticed in this connection that the rolls 11 are disposed at opposite sides of the lower seam of the pipe.

The lower longitudinal central portion of the main frame of the apparatus is preferably shaped as shown in Figure 2 in cross-section, and is designated by 13, and in the longitudinal center of said portion 13 is appropriately arranged a longitudinal feed screw 14, and a longitudinally movable head 15. It will also be understood by comparison of Figures 1 and 2 that transversely movable brackets 16 are mounted in the main frame and are adjustable through the medium of transverse screws 17 with hand wheels 18 at their outer ends, and are utilized to carry supporting rolls 19 on and against which the pipe sections are arranged as shown in Figure 2.

Appropriately mounted in the main frame and arranged in vertical alinement with the spaced rolls 11 is a hollow roll 20, preferably of copper or analogous material, and designed to form a ground, and provided with cooling water through a pipe 21, Figure 1. The roll 20 is maintained in a cool state for the reasons hereinbefore set forth with reference to the upper hollow roll 9.

At one end the feed screw 14 is provided with a worm gear 30 in mesh with a worm 31 fixed with respect to a spur gear 32, the latter being in mesh with a spur gear 33 connected in the manner illustrated in Figure 1 or in any other approved manner with the armature shaft 34 of an electric motor 35. Thus when the electric motor 35 is in operation, the screw shaft 14 will be operated at a suitable speed for welding operations.

The head 15 straddles the screw shaft 14 after the manner shown in Figure 2, and said head 15 is provided with traveling wheels 40, preferably arranged and shaped as shown by dotted lines in Figures 1 and 2. Carried by the head 15 is a lever 41, and to one arm of said lever 41 is connected a nut 42 designed to rest on and engage the screw shaft 14. By virtue of this provision it will be understood that when the lever 41 is utilized to engage the nut 42 with the screw shaft 14, the rotation of the said screw shaft 14 will be attended by longitudinal movement of the pipe sections 1, the said pipe sections 1 being connected to the head 15 in the manner which will now be described. As shown in Figures 1 and 2, the head 15 carries rolls 50 on which the pipe sections 1 are disposed, and the said head 15 is apertured at 51 for the reception of longitudinally disposed wedges 52, through the medium of which the pipe sections 1 are clamped against the rolls 50 with the result that the said pipe sections 1 are adequately connected by this or any other approved and suitable method to the head 15 so that the pipe sections 1 will partake of the longitudinal movement of the head 15.

At 60, Figure 1, the main frame of the apparatus is preferably, though not necessarily, equipped with a drum 60.

It will be understood from the foregoing that the pipe sections 1 are moved longitudinally of the apparatus incident to the welding operation, and when the welding operation has been completed, the motor 35 is reversed and the head 15 is released from the screw shaft 14, after which a haul-back drum clutch such as 80 is engaged with the shaft 14, and the drum 60 being in connection with said clutch is utilized through the medium of a cable, not shown, to draw the pipe back to its initial position, and this at a higher rate of speed than is used during the welding operation.

It will be apparent from the foregoing that notwithstanding the practical advantages ascribed to our novel apparatus, the apparatus is not unduly complicated and in general is well adapted to withstand the usage to which apparatus of corresponding character is ordinarily subjected.

Manifestly it is within the purview of our invention to use any means other than that described for the movement of the pipe subsequently to the completion of the welding operation.

We have entered into a detailed description of the construction and relative arrangement of the parts embraced in the present and preferred embodiment of our invention in order to impart a full, clear and exact understanding of the said embodiment. We do not desire, however, to be understood as limiting ourselves to the precise construction and relative arrangement of elements as disclosed, our invention being defined by our appended claims within the scope of which structural changes and changes in arrangement may be made without departure from our invention.

Having described our invention, what we claim and desire to secure by Letters Patent, is:—

1. In means for welding pipe sections together and in combination, means for moving pipe sections longitudinally, hollow cooled rolls disposed below the lower and upper contiguous edges of the pipe sections, and electrodes disposed above the lower and upper contiguous edges of the pipe sections.

2. In means for welding pipe sections together and in combination, means for moving pipe sections longitudinally, hollow cooled rolls disposed below the lower and upper contiguous edges of the pipe sections, and electrodes disposed above the lower and upper contiguous edges of the pipe sections; the said cooled rolls being of any suitable material banded with copper or analogous material.

3. In means for welding pipe sections together and in combination, means for moving pipe sections longitudinally, hollow cooled rolls disposed below the lower and upper contiguous edges of the pipe sections, and electrodes disposed above the lower and upper contiguous edges of the pipe sections; with means for pressing the contiguous portions of the pipe sections against the cooled rolls to conduce to the maintenance of an adequate ground for the electric current.

4. In a pipe welding apparatus and in combination, a main frame, a stationary mandrel, a hollow cooled roll carried by the upper portion of said mandrel, spaced pipe section engaging rolls carried by the lower portion of the mandrel, a lower cooled roll mounted in the main frame, and disposed below said spaced rolls, electrodes complementary to the cooled rolls and arranged opposite and in spaced relation to the periphery thereof, means for pressing and holding pipe sections against the upper cooled roll, and means moving the pipe sections longitudinally between said cooled rolls and electrodes.

5. In a pipe welding apparatus and in combination, a main frame, a stationary mandrel, a hollow cooled roll carried by the lower portion of said mandrel, spaced pipe section engaging rolls carried by the lower portion of the mandrel, a lower cooled roll mounted in the main frame, and disposed below said spaced rolls, electrodes complementary to the cooled rolls and arranged opposite and in spaced relation to the peripheries thereof, means for pressing and holding pipe sections against the upper cooled roll, and means moving the pipe sections longitudinally between said cooled rolls and electrodes; the said means comprising a longitudinal feed screw, means for driving said screw, a longitudinally movable head, means for attaching pipe sections to said head, and means for connecting and disconnecting the head from the feed screw, said connecting and disconnecting means being manually or automatically controlled.

6. In a pipe welding apparatus and in combination, a traveling head for moving pipes, said head equipped with rolls and with a portion that is apertured, and wedge means for use in conjunction with said apertured portion in clamping a pipe or pipe section against said roll.

7. In a pipe welding apparatus and in combination, a main frame, a longitudinal screw shaft, a motor connected with and adapted to rotate said screw shaft, welding instrumentalities, a traveling head for moving a pipe or pipe section with respect to said welding instrumentalities, a nut carried by said head and movable into and out of engagement with said screw shaft, operative controlled means for moving said nut, a clutch member on the screw shaft, and means cooperating with said clutch member whereby subsequent to welding operation, a pipe or pipe section may be expeditiously retracted.

8. In a pipe welding apparatus and in combination, a main frame, a stationary mandrel, transverse rolls mounted in the main frame and spaced apart and provided with circumferential grooves, screws for feeding said rolls downwardly and holding the same against upward movement, an upper roll carried by the mandrel, a lower roll carried by the main frame, rolling means on the mandrel for holding pipe sections against the lower roll, transversely adjustable brackets mounted in the main frame and provided with rolls to engage and support pipe sections, a longitudinal screw shaft, means for rotating the same, a head equipped for the attachment thereto of pipe sections, said head movable longitudinally of the main frame, and an operative controlled nut carried by the head and movable into and out of engagement with the screw shaft.

In testimony whereof we affix our signatures.

FRANK P. OFNER.
WALTER H. NOURSE.